United States Patent
Bierwirth et al.

(10) Patent No.: US 7,152,321 B2
(45) Date of Patent: Dec. 26, 2006

(54) METHOD OF PRODUCING A GAS GENERATOR HOUSING PART, GAS GENERATOR INCLUDING SUCH HOUSING PART AND GAS BAG MODULE

(75) Inventors: Sebastian Bierwirth, Rechtmehring (DE); Karsten Schwuchow, Wasserburg (DE); Achim Hofmann, Polling (DE); Thomas Kapfelsperger, Mühldorf (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 335 days.

(21) Appl. No.: 10/648,961

(22) Filed: Aug. 27, 2003

(65) Prior Publication Data
US 2004/0070186 A1 Apr. 15, 2004

(30) Foreign Application Priority Data
Sep. 3, 2002 (DE) ................. 102 40 640

(51) Int. Cl.
B21D 51/16 (2006.01)
B23K 20/00 (2006.01)
B23K 20/12 (2006.01)
B60R 21/26 (2006.01)

(52) U.S. Cl. ................. 29/890.14; 228/112.1; 228/114.5; 228/193; 280/736; 280/741

(58) Field of Classification Search ............. 29/890.14; 219/78.01, 59.1; 228/193, 112.1, 114.5
See application file for complete search history.

(56) References Cited

U.S. PATENT DOCUMENTS

| | | | | |
|---|---|---|---|---|
| 4,317,269 A | * | 3/1982 | Martin et al. ............. | 29/890.07 |
| 5,000,479 A | | 3/1991 | Werner et al. | |
| 6,089,617 A | * | 7/2000 | Craig et al. ............... | 285/288.1 |
| 6,152,351 A | * | 11/2000 | Separautzki et al. ........ | 228/114 |
| 6,406,060 B1 | * | 6/2002 | Katsuda et al. ............. | 280/736 |
| 6,746,046 B1 | * | 6/2004 | Rink et al. .................. | 280/737 |
| 6,830,264 B1 | * | 12/2004 | Al-Amin ..................... | 280/736 |
| 6,957,761 B1 | * | 10/2005 | Staheli et al. ............. | 228/112.1 |
| 6,981,718 B1 | * | 1/2006 | Blackburn .................. | 280/737 |
| 2003/0057695 A1 | * | 3/2003 | Toyooka et al. ............ | 280/781 |

FOREIGN PATENT DOCUMENTS

| | | |
|---|---|---|
| DE | 3832120 | 7/1991 |
| DE | 4019677 | 1/1992 |

(Continued)

OTHER PUBLICATIONS www.encarta.msn.com dictionary definition of "ring".*

(Continued)

*Primary Examiner*—David P. Bryant
*Assistant Examiner*—Sarang Afzali
(74) *Attorney, Agent, or Firm*—Tarolli, Sundheim, Covell & Tummino LLP

(57) ABSTRACT

A gas generator housing part is produced of a thin-walled tube having a wall thickness which amounts to a maximum of 10% of a tube external diameter and a minimum tensile strength which amounts to at least approximately 800 $N/mm^2$, and a connecting piece having an external diameter which amounts to between 15% and 40% of the tube external diameter. After aligning the connecting piece radially to the tube such that an end face of the connecting piece faces an outer face of the tube, the tube and the connecting piece are joined by friction welding. A maximum welding time amounts to less than 1 second, preferably less than 0.3 second and a friction depth amounts to less than 80% of the wall thickness of the tube.

15 Claims, 2 Drawing Sheets

FOREIGN PATENT DOCUMENTS

| | | |
|---|---|---|
| DE | 4102615 | 8/1992 |
| DE | 19538386 | 4/1997 |
| DE | 10022462 | 11/2000 |
| EP | 0715995 | 6/1996 |
| EP | 1319558 | 6/2003 |

OTHER PUBLICATIONS

Article entitled "Formation Process of Reaction Layer Between Aluminium Alloys and Stainless Steel by Friction Welding", pp. 941-946.

* cited by examiner

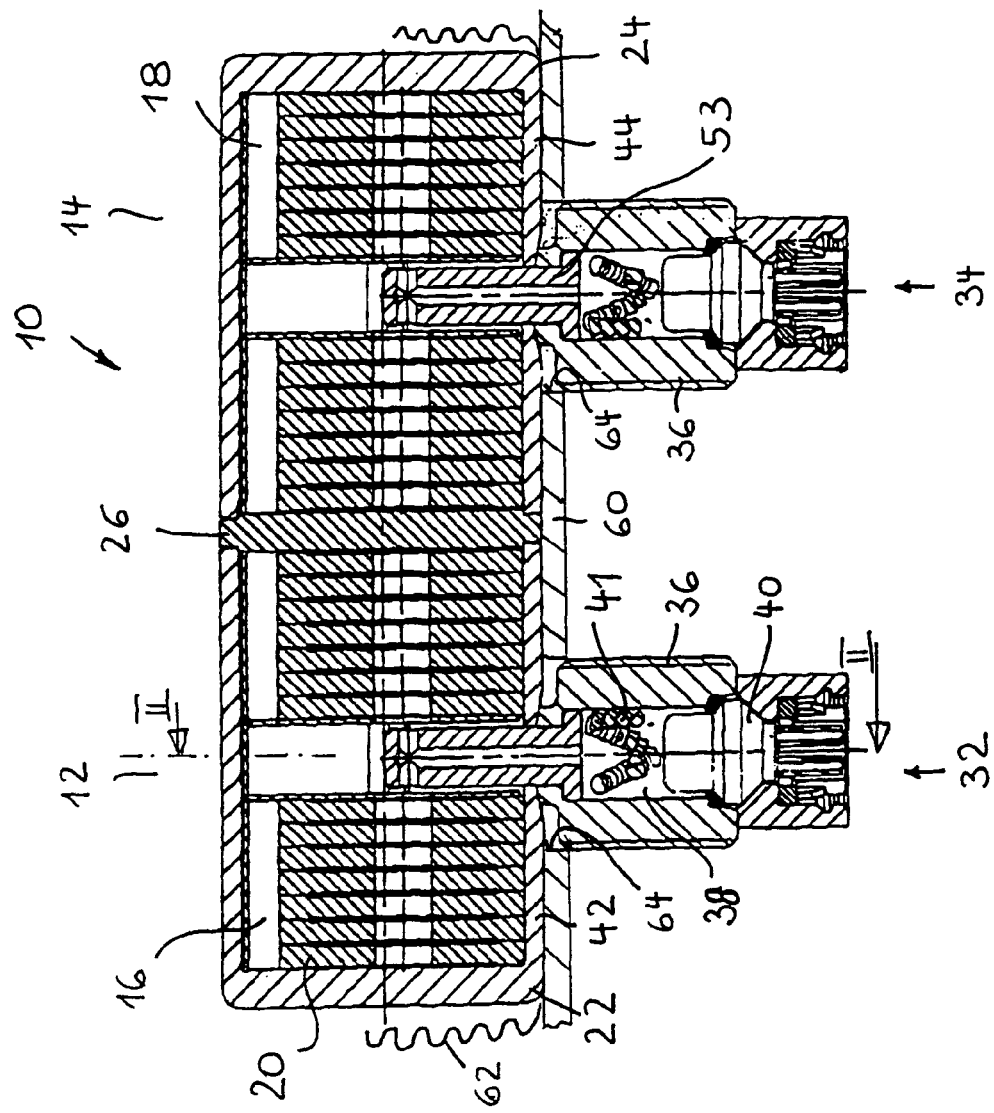
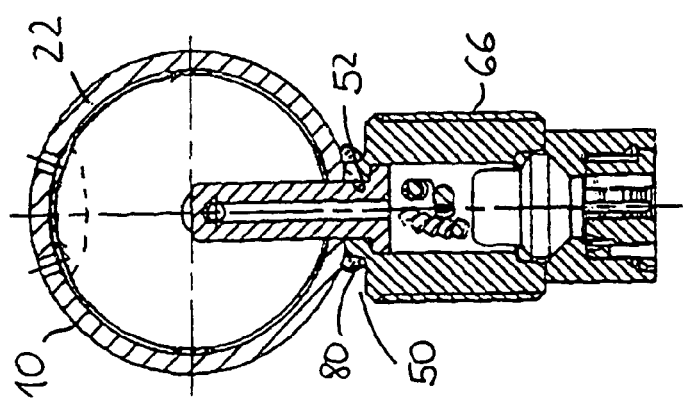

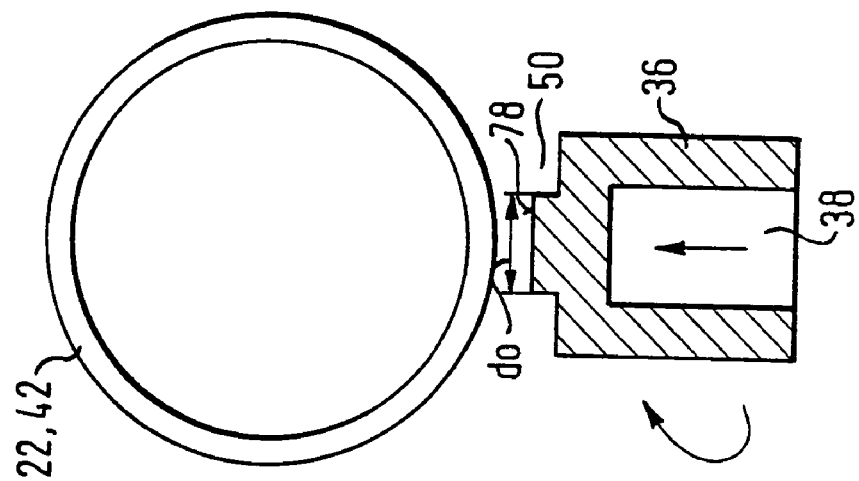
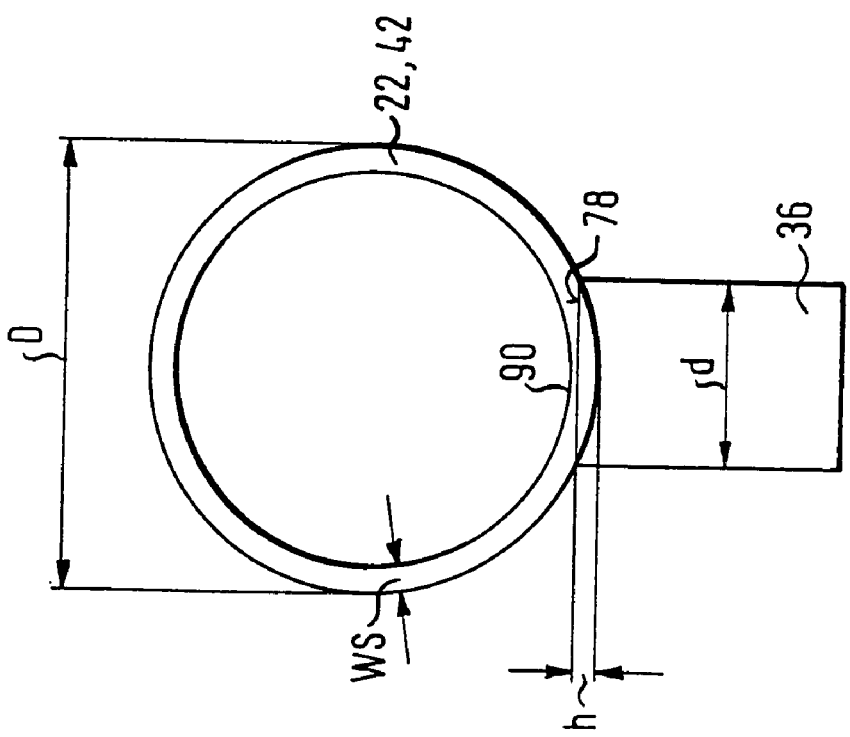

METHOD OF PRODUCING A GAS GENERATOR HOUSING PART, GAS GENERATOR INCLUDING SUCH HOUSING PART AND GAS BAG MODULE

TECHNICAL FIELD

The invention relates to a method of producing a gas generator housing part of a thin-walled tube and of at least one laterally arranged connecting piece. In particular, the invention relates to a method of mounting a hollow igniter mounting housing to the tube defining an outer housing of the gas generator.

BACKGROUND OF THE INVENTION

High requirements with regard to strength and tightness are set for a connection between a thin-walled tube as part of a gas generator housing and a connecting piece arranged thereon. The connection is to have a strength, as far as possible, which corresponds to the bursting strength of the tube. Preferably, the two parts are connected with each other by welding, which is problematical, however, because through the fact that the tube has thin walls, the material structure can be altered in an undesired manner due to too high an input of heat. If a thick connecting piece, which is solid at the connecting end, is welded externally onto a thin-walled tube, it is in fact principally the peripheral wall which is exposed to excessively high stresses during welding. On the other hand, gas generator housing parts can not, unfortunately, have peripheral walls with a high wall thickness, due to the weight requirements.

The invention provides a method of producing a gas generator housing part, in which the tube only has a wall thickness of a maximum 10%, preferably approximately 7% of the external diameter (D) of the tube.

BRIEF SUMMARY OF THE INVENTION

According to the method of the invention there are provided the following steps:
a) Providing a tube having a wall thickness which amounts to a maximum 10% of the tube external diameter (D) and a minimum tensile strength which amounts to at least approximately 800 N/mm$^2$;
b) Providing a connecting piece having an external diameter which amounts to between 15% and 40% of the tube external diameter (D);
c) Aligning the connecting piece radially to the tube such that an end face of the connecting piece faces the outer face of the tube;
d) Joining the tube and the connecting piece by friction welding, by producing a relative rotation between the tube and the connecting piece and moving the tube and the connecting piece towards each other,
e) the maximum welding time amounting to less than 1 sec, preferably less than 0.3 sec and
f) the friction depth amounting to less than 80% of the wall thickness of the tube.

The method according to the invention provides a fine coordination of various parameters, which for the first time allow a relatively thick connecting piece to be laterally mounted to a thin-walled tube by friction welding. This welding process usually takes place in that the connecting piece is turned and then pressed radially against the peripheral wall of the tube. The friction depth is to be less than 80% of the wall thickness, preferably approximately two thirds of the wall thickness, so that on the inner face of the tube a wall section still remains which can offer a sufficient resistance to the radial action of force by the connecting piece.

As has been found in the costly development and in numerous investigations, unexpectedly a thick connecting piece can, however, be arranged onto a thin-walled tube from the exterior radially by means of friction welding, when the friction depth is not so high and the tube has a minimum tensile strength of at least 800 N/mm$^2$.

A further surprise is the finding that the tube is preferably to remain non-machined on the welding surface before the welding process. This means that the tube is not machined or pressed flat in the region of the welding surface, i.e. the contact surface between the connecting piece and the outer surface of the tube, in order to provide as precise and large a contact surface as possible between the connecting piece, which is to be welded on the end face, and the peripheral wall. It is merely advantageous to clean the outside of the tube in the region of the welding surface. Thus, it is the flat end face of the connecting piece which meets the curved outer surface of the tube. Due to the tube being non-machined in the region of the welding surface, however, the peripheral wall has a higher stability in this region than in the machined state and can offer a greater resistance to the radial force which is exerted on it by the connecting piece. Although the contact surfaces are therefore less large and are aligned to each other less precisely, which can result in a longer welding time, this disadvantage is surprisingly more than compensated by the greater stability of the peripheral wall.

The tube has a wall thickness of a maximum of 2.5 mm, preferably even a maximum of 2 mm, and a tube external diameter of approximately 35 mm.

The method according to the invention is applied in particular in a connecting piece which is used as an igniter mounting housing, i.e. is hollow. The igniter and the charge are then in connection with the interior of the tube via a through-bore which is provided in the connecting piece and in the peripheral wall and is produced after welding.

The connecting piece can have a smaller diameter end on the tube side.

The end of the connecting piece which is to be fastened by welding is solid, however, i.e. without a through-bore. Preferably, the end face which is brought into contact with the peripheral wall is flat, so that at the start of the friction welding process a line contact is produced. An advantage of the smaller diameter end consists in that after the friction welding process, the smaller diameter end forms a groove in which the weld bead lies. With this, it can become unnecessary to further machine the weld bead, because it lies protected, preferably completely inside the groove and does not represent any risk of injury.

The invention further relates to a gas generator which is produced in accordance with the method of the invention. The gas generator is distinguished in that the connecting piece is hollow and holds an igniter which is connected with the interior of the tube via a through-bore in the connecting piece, a combustion chamber containing a pyrotechnic material preferably being provided inside the tube.

Finally, the invention also relates to a gas bag module with a gas generator according to the invention or produced according to the invention, and a generator holding plate. The connecting piece serves here as a device for fastening the gas generator to the generator holding plate, so that the connection between the connecting piece and gas generator meets further additional strength requirements.

BRIEF DESCRIPTION OF THE DRAWINGS

FIG. 1 shows a longitudinal sectional view through an embodiment of the gas bag module according to the invention with a gas generator according to the invention, produced by the method according to the invention, FIG. 2 shows a section through the gas generator along line II—II in FIG. 1, FIG. 3 shows the cross-section according to FIG. 2 in a simplified symbolic illustration to indicate the dimensions of tube and connecting piece, and FIG. 4 shows the tube and the connecting piece before the production of the friction weld connection.

DETAILED DESCRIPTION OF THE PREFERRED EMBODIMENTS

In FIG. 1 a two-stage tubular gas generator 10 is illustrated. The stages 12 and 14 are defined by two separate combustion chambers 16 and 18, respectively, which are filled with disc-shaped pyrotechnic solid propellant 20. The cylindrical outer housing of the gas generator 10 is formed by two tubes 22, 24 which are each associated with a stage 12 and 14, respectively, and which are connected with each other by means of a dividing wall 26. The two tubes 22, 24 have a closed end on the end face, facing outwards, and also an opposite, open end. An igniter unit 32, 34 is also associated to each stage 12, 14.

Each igniter unit 32, 34 consists of a cylindrical, tubular connecting piece which forms an igniter mounting housing 36 and has in the interior a mounting space 38 to accommodate an igniter 40 and a charge 41. The igniter mounting housing 36 is represented by two connecting pieces which project radially from the cylindrical peripheral walls 42, 44 and are fastened thereto from the exterior.

The end of the igniter mounting housing 36 on the tube side, facing the peripheral wall 42, 44, has a much smaller diameter, forming a shoulder. The smaller diameter end is given reference number 50. At this end, on the end face, the igniter mounting housing 36 and the peripheral wall 42, 44 have a through-bore 52 opening out into the mounting space 38. A finger-like gas inlet nozzle 53 projects from the mounting space 38 through the through-bore 52 into the interior of the associated combustion chamber 16, 18.

The gas generator 10 is part of a gas bag module which has a generator holding plate 60 and a gas bag 62, which is inflated by the gas generator 10. The igniter mounting housings 36, acting as connecting piece, also serve as a device for fastening the gas generator 10 to the generator holding plate 60, which has openings 64 through which the igniter mounting housings 36 are inserted from above. On the outer surface of the igniter mounting housing, a thread, a securing groove or a so-called 3-K-profile 66 is formed, which is described for example in DE 42 09 153 A1, which in this respect is incorporated herein by reference. A nut or another counter-piece equipped with the 3-K-profile can then be screwed from below onto the igniter mounting housing 36 to clamp the generator holding plate 60.

The method for producing a gas generator housing piece, namely a unit of the tube 22 or 24 and its associated igniter mounting housing 36, is described below. For simplification, only the connection between the tube 22 and the igniter mounting housing 36 is described, because the other housing part (tube 24 and associated igniter mounting housing 36) is produced in the same way and has the same geometries which are important for the method.

The tube 22 has a tube external diameter D of approximately 35 mm and a very small wall thickness WS, which amounts to a maximum of 10%, preferably approximately 7% of the tube external diameter D, the present one preferably is even less than 2 mm thick, and consists of a material with a minimum tensile strength of at least approximately 800 N/mm$^2$. The connecting piece, i.e. the igniter mounting housing 36, has a diameter do in the region of the smaller diameter end 50, which amounts to between 15 to 40%, preferably approximately 30% of the tube external diameter D.

The end face 78 of the connecting piece is flat before welding, and the connecting piece end, to be welded on, is solid; the mounting space 38, however, may have been fabricated in advance. The outer face of the tube 22 in the region of the contact (welding surface) is only cleaned before the welding process, but is otherwise entirely unprocessed and not flattened.

Both parts are clamped into a corresponding tool, the alignment of the igniter mounting housing 36 taking place radially to the tube 22. The igniter mounting housing 36 is turned and moved radially onto the tube 22, the two parts thereby being friction-welded. The welding time amounts to less than 1 sec, preferably less than 0.3 sec, so that a development of heat takes place only relatively briefly. The friction depth h, which can be seen in FIG. 3, amounts to less than 80% of the wall thickness WS, preferably approximately two thirds thereof. The igniter mounting housing 36 thereby does not penetrate into the interior of the tube but, rather, a wall section 90 remains between the inner face of the tube 22 and the end face 78 of the igniter mounting housing 36, which contributes to the maintaining of the stability of the peripheral wall 42. Optionally, a holding body could in fact be introduced into the interior of the tube during friction welding, in order to prevent a wall deformation; however, in the preferred embodiment of the invention, such a body can be omitted.

The smaller diameter end 50, which is still present after the welding process, serves to receive the weld bead 80, which lies entirely inside the smaller diameter end 50 and does not require any further processing.

The method according to the invention can also be used for arranging a threaded connecting piece on a thin-walled tube.

The invention claimed is:

1. A method of producing a gas generator housing part of a thin-walled tube (22, 24) and a connecting piece laterally mounted thereto, characterized by the following steps:
   a) providing a tube (22, 24) having a wall thickness (WS) which amounts to a maximum of 10% of a tube external diameter (D) and a minimum tensile strength which amounts to at least approximately 800 N/mm$^2$.
   b) providing a connecting piece having an external diameter (do) which amounts to between 15% and 40% of said tube external diameter (D);
   c) aligning said connecting piece radially to said tube (22, 24) such that an end face (78) of said connecting piece faces an outer face of said tube (22, 24);
   d) joining said tube (22, 24) and said connecting piece by friction welding, by producing a relative rotation between said tube (22, 24) and said connecting piece and moving said tube (22, 24) and said connecting piece towards each other,
   e) providing a maximum welding time amounting to less than 1 sec, and
   f) providing a friction depth (h) amounting to less than 80% of said wall thickness (WS) of said tube (22, 24).

2. The method according to claim 1 including the steps of:
g) providing another tube (22, 24) and another connecting piece;
h) aligning said another connecting piece radially to said another tube (22, 24) such that an end face (78) of said another connecting piece faces an outer face of said another tube (22, 24); and
i) joining said another tube (22, 24) and said another connecting piece by friction welding, by producing a relative rotation between said another tube (22, 24) and said another connecting piece and moving said another tube (22, 24) and said another connecting piece towards each other.

3. The method according to claim 2 including the step of providing a friction depth (h) amounting to less than 80% of a wall thickness (WS) of said another tube (22, 24).

4. The method according to claim 1, characterized in that said tube (22, 24) has a welding surface which is non-machined before said friction welding process.

5. The method according to claim 1, characterized in that said tube (22, 24) has a peripheral wall (42, 44) with a wall thickness (WS) of a maximum of 2.5 mm.

6. The method according to claim 1, characterized in that said connecting piece has a smaller diameter end on a tube side.

7. The method according to claim 1, wherein said connecting piece is aligned radially with respect to a longitudinal axis of said tube (22, 24).

8. The method according to claim 1, wherein the friction depth (h) is more than 20% of the wall thickness (VVS) of said tube (22, 24).

9. The method according to claim 1, wherein the friction depth (h) is approximately two thirds of the wall thickness (WS) of said tube (22, 24).

10. A method of producing a gas generator housing part of a thin-walled tube (22, 24) and a connecting piece laterally mounted thereto, characterized by the following steps:
a) providing a tube (22, 24) having a wall thickness (WS) which amounts to a maximum of 10% of a tube external diameter (D) and a minimum tensile strength which amounts to at least approximately 800 N/mm$^2$;
b) providing a connecting piece having an external diameter (do) which amounts to between 15% and 40% of said tube external diameter (D);
c) aligning said connecting piece radially to said tube (22, 24) such that an end face (78) of said connecting piece faces an outer face of said tube (22, 24);
d) joining said tube (22, 24) and said connecting piece by friction welding, by producing a relative rotation between said tube (22, 24) and said connecting piece and moving said tube (22, 24) and said connecting piece towards each other,
e) providing a maximum welding time amounting to less than 1 sec, and
f) providing a friction depth (h) amounting to less than 80% of said wall thickness (WS) of said tube (22, 24), wherein said connecting piece has a smaller diameter end on a tube side, said smaller diameter end, with said connecting piece welded on, forms a groove in which a weld bead (80) is situated.

11. The method according to claim 10, characterized in that before welding, said connecting piece has a flat end face (78) on said tube side.

12. The method according to claim 11, characterized in that before welding, said connecting piece is solid at an end on said tube side.

13. The method according to claim 10, characterized in that said weld bead (80) lies entirely inside said groove.

14. The method according to claim 10, characterized in that said weld bead (80) produced is not reworked.

15. A method of producing a gas generator housing part of a thin-walled tube (22, 24) and a connecting piece laterally mounted thereto, characterized by the following steps:
a) providing a tube (22, 24) having a wall thickness (WS) which amounts to a maximum of 10% of a tube external diameter (D) and a minimum tensile strength which amounts to at least approximately 800 N/mm$^2$;
b) providing a connecting piece having an external diameter (do) which amounts to between 15% and 40% of said tube external diameter (D);
c) aligning said connecting piece radially to said tube (22, 24) such that an end face (78) of said connecting piece faces an outer face of said tube (22, 24);
d) joining said tube (22, 24) and said connecting piece by friction welding, by producing a relative rotation between said tube (22, 24) and said connecting piece and moving said tube (22, 24) and said connecting piece towards each other,
e) providing a maximum welding time amounting to less than 1 sec,
f) providing a friction depth (h) amounting to less than 80% of said wall thickness (WS) of said tube (22, 24), and
g) drilling a through bore (52) into said connecting piece after welding, said bore (52) being connected with an interior of said tube via a lateral opening in said peripheral wall (42, 44) produced after welding.

* * * * *